(12) United States Patent
Sudbrack et al.

(10) Patent No.: US 9,370,140 B2
(45) Date of Patent: Jun. 21, 2016

(54) SINGLE SENSOR AUTOMATIC CONTROL OF A LARGE BALE LOADER

(71) Applicant: CNH INDUSTRIAL AMERICA, LLC, New Holland, PA (US)

(72) Inventors: Cecil R Sudbrack, New Holland, PA (US); Robert L. Fackler, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/341,533

(22) Filed: Jul. 25, 2014

(65) Prior Publication Data

US 2016/0021824 A1    Jan. 28, 2016

(51) Int. Cl.
*A01D 90/08* (2006.01)
*B60P 1/48* (2006.01)

(52) U.S. Cl.
CPC .. *A01D 90/08* (2013.01); *B60P 1/48* (2013.01)

(58) Field of Classification Search
CPC .................................. A01D 90/08; B60P 1/48
USPC ............................................................ 701/50
See application file for complete search history.

(56) References Cited

U.S. PATENT DOCUMENTS

| 4,149,639 | A | 4/1979 | Wells et al. |
| 4,204,792 | A | 5/1980 | Wynn et al. |
| 4,268,199 | A | 5/1981 | Fontrier |
| 4,310,275 | A | 1/1982 | Hoelscher |
| 4,844,675 | A | 7/1989 | Strosser et al. |
| 6,220,811 | B1 | 4/2001 | Bernecker |
| 6,233,511 | B1 * | 5/2001 | Berger et al. ................... 701/50 |
| 6,655,266 | B2 | 12/2003 | Brown, Jr. |
| 6,997,663 | B2 | 2/2006 | Siebenga |
| 8,112,202 | B2 | 2/2012 | Fackler et al. |
| 8,371,791 | B2 | 2/2013 | Kenna |
| 2010/0299029 | A1 * | 11/2010 | Fackler et al. .................. 701/50 |
| 2010/0303596 | A1 | 12/2010 | Dagorret |
| 2011/0190942 | A1 * | 8/2011 | Nicholson et al. ............ 700/275 |

FOREIGN PATENT DOCUMENTS

EP        2545763 A1    1/2013

* cited by examiner

*Primary Examiner* — Rodney Butler
*Assistant Examiner* — Anne Mazzara
(74) *Attorney, Agent, or Firm* — Patrick M. Sheldrake

(57) ABSTRACT

An improved control system for managing rotation of a bale loading arm in a bale loader in which a single position sensor combined with a purposefully designed sensor target enable loading arm position to be efficiently determined by a controller in order to direct the actuator movements based upon loading arm position necessary for automated operation of a bale loading cycle.

20 Claims, 4 Drawing Sheets

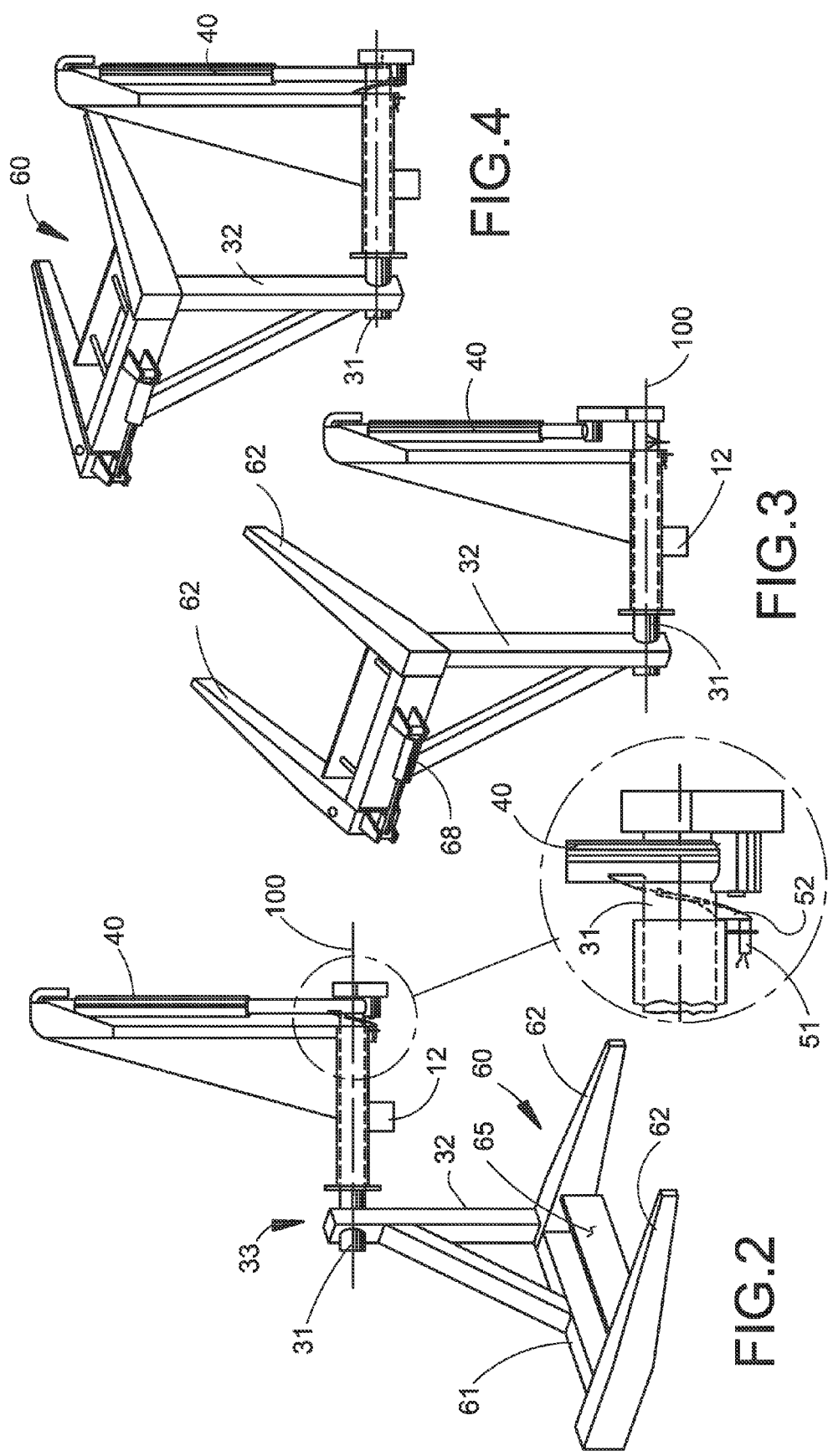

SINGLE SENSOR AUTOMATIC CONTROL OF A LARGE BALE LOADER

BACKGROUND OF THE INVENTION

The present invention relates generally to agricultural bale handling and hauling machines, and more particularly to such a single sensor control system for a bale wagon that automates the loading of large bales onto a bale wagon.

The Mil-Stak® big bale loading attachment was developed as a way incorporate big bale handling capability on self-propelled or pull-behind bale wagons. The Mil-Stak® big bale loading attachment comprises a bale clamping apparatus connected to a pivoting lifting arm. The lifting arm is coupled at one end to the bale wagon for pivotal motion about a single axis, the axis being angled relative to the bale wagon. Loader arm movement is accomplished using a single actuator acting on a lever arm to pivot the lifting arm through approximately 180 degrees of motion. A full sweep of the loader arm requires the actuator to be moved in a first direction for approximately half of the rotation and then in an opposite direction for the remain half of the rotation. A second actuator actuates the clamping apparatus.

An automated system for controlling movement of the lifting arm and clamping apparatus is disclosed in U.S. Pat. No. 8,112,202 issued to Fackler, et al. to replace the previously used manual control method. The automated system relies upon multiple sensors to manage movement of the lifting arm as it rotates through an apogee in its movement at which point the direction of movement of the single actuator is reversed to complete the lifting arm rotation. The known configuration requires a mount to facilitate placement of two sensors about the rotational axis angled approximately 120 degrees apart and a large cam surface to serve as a target for the two sensors. The result is a sensing system requiring substantial space in the area surrounding the lifting arm pivoting connection, an area that leaves the sensing apparatus relatively exposed to debris and damage.

Significant advantages would be realized by a control system for a bale lifting arm that could be more compactly retrofitted onto the Mil-Stak® big bale loading attachment to reduce the necessary installation space and attendant risk of damage. Additional advantages would be realized by a control system for a bale lifting arm using fewer position sensors while offering comparable control performance. A system in which the bale lifting arm position could be monitored by a single position sensor through its 180 degree range of motion would offer the greatest benefit to reducing cost, part count, and system complexity while also enabling the system to be more compactly packaged on the lifting arm.

SUMMARY OF THE INVENTION

Accordingly, the present invention, in any of the embodiments described herein, may provide one or more of the following advantages:

It is an object of the present invention to provide an improved control system for a big bale loader on a bale wagon capable of controlling movement of a pivoting loader arm throughout its entire range of movement during a bale loading cycle. The improvements include reducing the number of position sensors to one and reducing the space requirements for the position sensing apparatus compared to the previously known multi-sensor model.

It is yet another object of the present invention to provide a position control system for a bale loading apparatus that operationally couples discrete action initiation signals and corresponding actions into a unified, controlled operational cycle requiring minimal operator input. A single sensor capable of monitoring and precisely signaling the rotational position of the bale loading apparatus throughout its entire range of motion is provided to generate position inputs to the control system and enable the system to generate the requisite control output for moving the apparatus.

It is yet another object of the present invention to provide an improved control system for a bale loading apparatus capable of managing all aspects of apparatus movement needed to lift a bale from a field and place it on the bale wagon with minimal operator input.

It is a still further object of the present invention to provide an improved single-sensor control system for managing the position of a loading arm on a bale loading apparatus that is durable in construction, inexpensive of manufacture, carefree of maintenance, easily assembled, and simple and effective to use.

These and other objects are attained by providing a control system for managing rotation of a bale loading arm in a bale loader in which a single position sensor combined with a purposefully designed sensor target enable loading arm position to be efficiently determined by a controller in order to direct the actuator movements based upon loading arm position necessary for automated operation of a bale loading cycle.

DESCRIPTION OF THE DRAWINGS

The advantages of this invention will be apparent upon consideration of the following detailed disclosure of the invention, especially when taken in conjunction with the accompanying drawings wherein:

FIG. 2 is a partial perspective view of the bale loading apparatus incorporating one embodiment of the present invention showing the loading apparatus in the fully lowered position;

FIG. 3 is a partial perspective view of the bale loading apparatus of FIG. 2 showing the apparatus in the fully raised position;

FIG. 4 illustrates a first embodiment of a single sensor position monitoring system for monitoring bale load loading apparatus position;

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
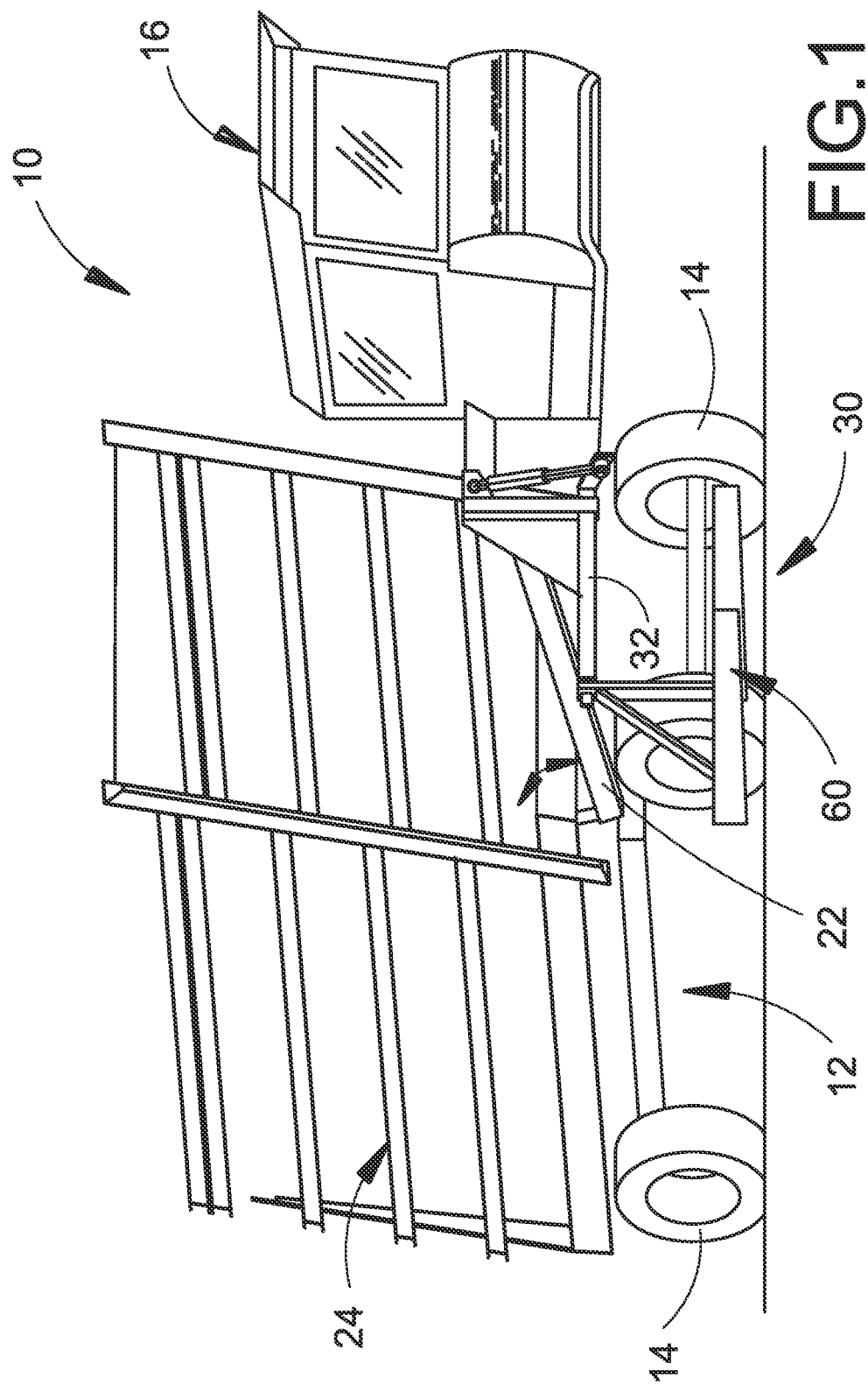
FIG. 1 is a front perspective of a bale wagon having a bale loader of the type on which the present invention is useful.

Referring now to the drawings and, particularly, to FIG. 1, a frontal perspective view of a well-known bale wagon incorporating the principles of the instant invention can be seen. The present invention is also useful on pull-behind bale wagons (bale wagons towed by a separate tractor or prime mover). Thus while the description herein is based upon application of the bale loader to a self-propelled wagon, the principles of the instant invention are equally useful on pull-behind bale wagons and should be construed as such. The bale wagon, generally designated 10, is provided with a mobile chassis 12 having wheels 14 and an operator cab 16. The cab 16 also includes the various controls both for the operation of the bale wagon as a vehicle and for the operation of the various bale loading and stacking portions of the machine. This bale wagon is of the self-propelled type; however, the primary source of power and some of the drive mechanism have been removed to simplify the drawing for purposes of clarity. The bale wagon 10 has the ability to function as an off-highway agricultural vehicle capable of good maneuverability and low speed for picking up bales, yet transport over the road from field to field.

The bale wagon 10 is generally described as a three-table bale wagon and is normally provided with a bale loader adapted to pick small bales up successively from the field and deposit them on a first table (not shown), also referred to as a cross-conveyor, for arrangement in a tier. As adapted in the present invention, bale loader 30 is configured to pick up larger "big" bales successively and place them on a second or tilting table 22 where they are arranged prior to loading onto a third table, referred to as the load rack 24. The first table is not utilized when big bales are being loaded as a single big bale (approximately 8 feet in length) typically spans the transverse width of the bale wagon. Bale loader 30, to be described in further detail below, is mounted to the forward portion of chassis 12, behind cab 16. Bales on the tilting table 22 are moved onto the load rack 24 by a pivoting movement of the tilting table. One, two, or three big bales (depending on the desired stack configuration) are typically simultaneously moved from the tilting table to the load rack resulting in one or two bales stacked upon the other when positioned on the load rack. When a sufficient quantity of bales is present in the load rack, the bale wagon is used to transport the bales to a location where the bales are to be stacked. The load rack 24 is pivotally connected to the chassis allowing it to be tilted to a near-vertical orientation, allowing the bales therein to be placed in a stack on the ground.

Bales are moved from the ground to the tilting table 22 by the bale loader, generally indicated by reference number 30. Bale loader 30 is mounted to chassis 12 and includes a pivoting bale loading arm 32 coupled to an elongate shaft 31, the shaft 31 having opposing first and second ends. Shaft 31 is rotationally supported by chassis 12 in a conventional manner using bearings, bushings or other known means for radially and axially supporting a rotating shaft. Bale loading arm 32 is connected to a first end of shaft 31 and extends radially therefrom to a pickup end 33. The connection between shaft 31 and bale loading arm 32 is configured to prevent relative movement therebetween such that bale loading arm 32 will be pivoted about axis 100 as shaft 31 rotates. Shaft 31 is oriented such that its rotational axis 100 is angled relative to the longitudinal axis of the bale wagon, typically near 45 degrees, in order to provide proper bale positioning, retrieving bales from the field forwardly and outwardly and placing them on the tilting table rearwardly and inwardly by motion of the bale loading arm 32. A lever arm 36 is connected to the second end of shaft 31 and configured to extend radially therefrom creating a moment arm on which actuator 40 can act to rotate the shaft 31. The bale pickup sequence requires the bale loading arm 32 to sweep through an arc of approximately 180 degrees of motion. Because the required rotation exceeds 90 degrees, the loader actuator 40, a single-acting hydraulic cylinder, is required to reverse the direction of movement of the cylinder rod as the loading arm 32 passes through the apogee position approximately midway through the sweep. Movement of the actuator 40 and loading arm 32 is managed by a control system which includes one or more sensors to monitor the position of the loading arm.

Bale pickup is accomplished using a bale grasping mechanism 60 which is connected to the pickup end 33 of the bale loading arm 32. Grasping mechanism 60 comprises a pair of spaced-apart grasping arms 62, each arm being movable to allow selective clamping of a bale therebetween. In operation, grasping arms 62 are initially positioned generally parallel to the ground and oriented generally parallel to the direction of travel of the bale wagon. The operator steers the bale wagon until the bale to be loaded is aligned in the space between the grasping arms 62 and adjacent the rearward base frame 61. As the bale wagon moves forward, the grasping arms 62 are positioned alongside the bale. Bumper 65 typically includes springs or similar means to lessen the impact forces of the bale contact with the base frame 61. Bumper 65 may also include a contact switch to provide a control input to initiate a bale loading cycle, described in greater detail hereinafter. Grasping arms 62 are then moved towards one another, typically by a grasp actuator 68, to grasp the bale for lifting.

Bale wagons of this type are generally well known in the art. Additional descriptive details of the bale wagon are provided in U.S. Pat. Nos. 2,848,127 issued to Grey, and 4,203,695, issued to Wynn, et al., the descriptive portions of which are incorporated herein by reference. Additional descriptive details on the operation and control of a bale loader are provided in U.S. Pat. No. 8,112,202 issued to Fackler, et al, the descriptive portion of which is also incorporated herein by reference.

Figure 6:
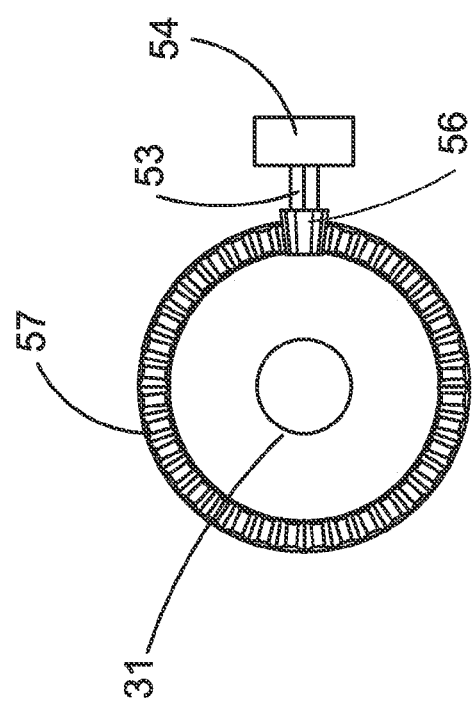
FIG. 6 illustrates a second embodiment of a single sensor position sensing system for monitoring bale loading apparatus position.
Figure 5:
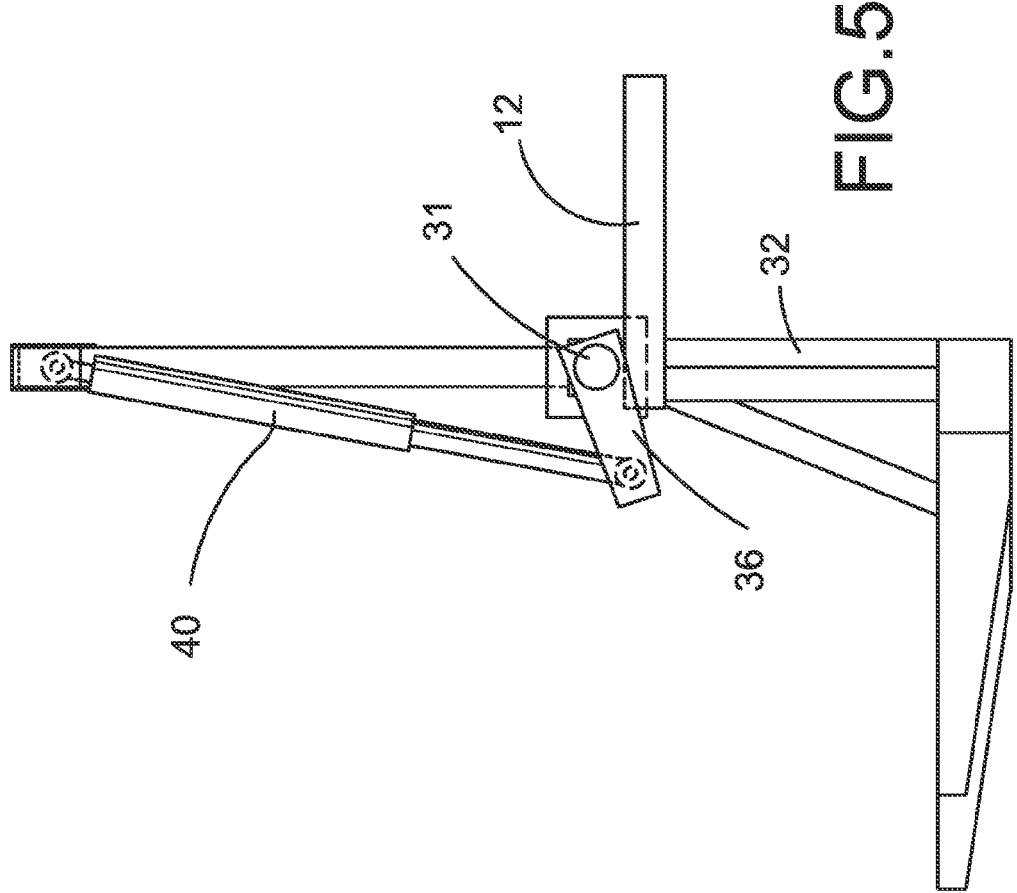
FIG. 5 is second view of the position sensor of FIG. 4.
Figure 7:
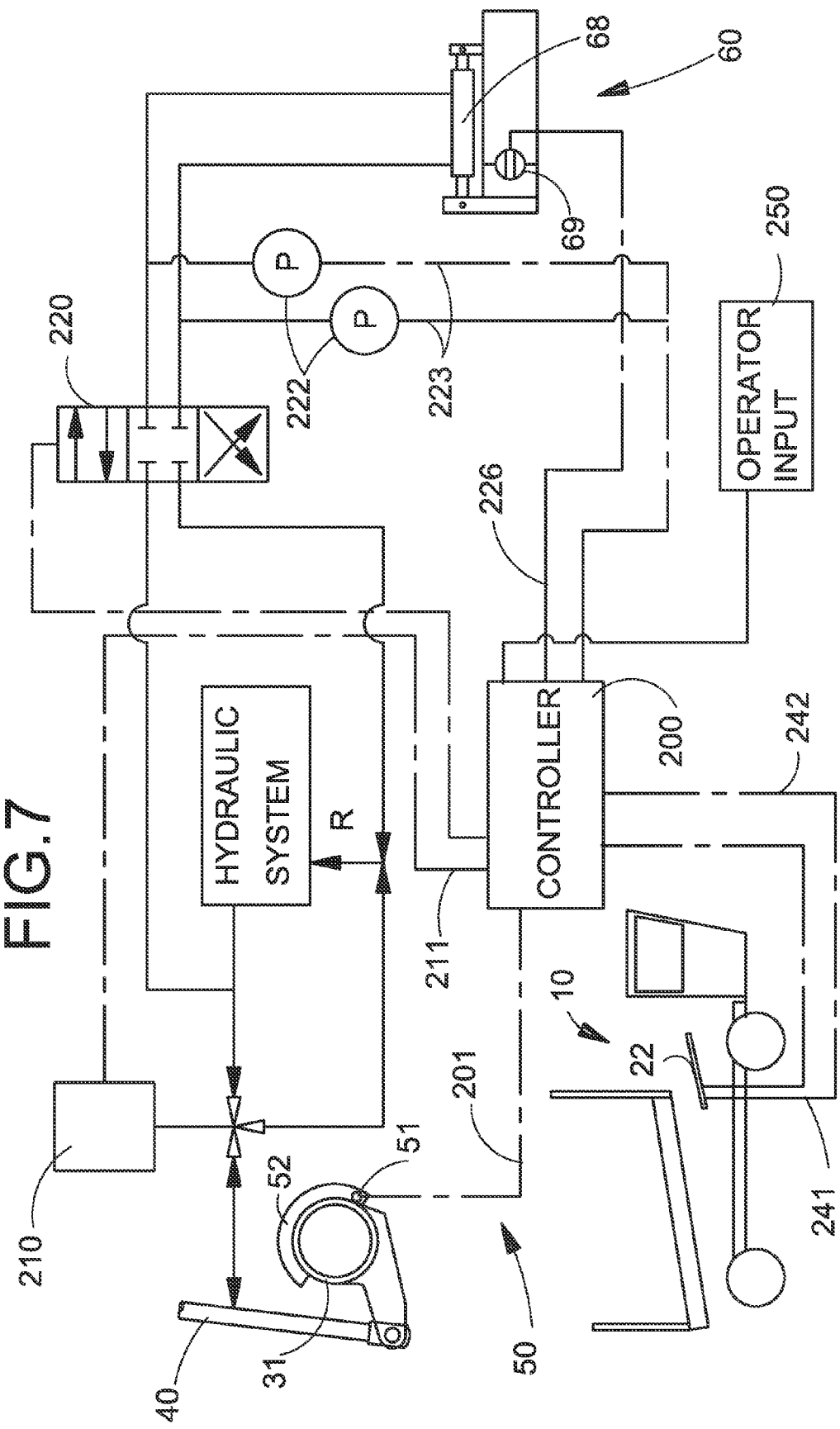
FIG. 7 is a simplified schematic of the control system embodying the present invention.

Now referring to FIGS. 4 through 6, monitoring and control of the position of the bale loading arm is accomplished by a loader control system 50. The control system 50 includes at least a sensors 51, 69 for monitoring the position of the bale loader arm shaft 31 and the bale grasping mechanism 60 and outputs to the loader and grasp actuators 40, 68. The known means for monitoring loader arm position comprises multiple non-contacting sensors and segmented sensor targets affixed to the loading arm 32 or shaft 31 and the loader actuator 40. The present invention improves upon the known method for monitoring loader arm position by reducing the number of sensors necessary to monitor loader arm movement throughout its entire range of motion, whether by non-contacting or by contactor sensors, by monitoring the loader arm position directly. Consequently, the loading arm position sensing arrangement simplifies the control input scheme and reduces the necessity of calibrating multiple sensors and sensor targets. Furthermore, the sensor arrangement can be made more compact.

In a first embodiment, a non-contacting proximity sensor 51 is fixed to the loader 30 in a manner preventing movement relative to the chassis 12. A sensor target 52 is affixed to the loader arm 32, lever arm 36, or shaft 31 for movement therewith. The target 52 is configured in a manner such that the separation between the surface of the target and proximity sensor 51 varies in a known relationship to rotation of the shaft 31 and movement of the loader arm 32. A linear relationship between shaft rotation and proximity is preferable, but not essential. Any loader arm position within the range must correlate to a unique separation between the target surface and the sensor so that any resulting signal value corresponds to a single loader arm position.

The sensor target 52 may be configured to produce variations in proximity from a fixed point in either the axial direction (in line with the shaft 31) or in the radial direction (along a radial axis to the shaft 31 centerline). In the exemplar embodiment shown in FIG. 2, the target is in the form of a surface extending generally perpendicular to the rotational axis of the shaft 31 and extending around a portion of the shaft circumference (e.g., a helix). As the shaft rotates approximately 180 degrees as the loader arm 32 sweeps between the limits of operation, the target 52 extends at least 180 degrees around the circumference so that the sensor 51 reads the target for the complete rotational movement. An alternate embodiment in which the sensor is radially aligned would require a target in the form of an eccentric surface extending at least 180 degrees around the circumference.

A second embodiment is illustrated in FIG. 6 in which a contacting sensor 54 is used. A linkage or gear interface 56, 57 is connected to the loader arm 32 or shaft 31 for movement therewith. The output of the linkage or gear interface is transferred by mechanical means 53 to the contacting sensor 54 which generates an output signal representative of the position of the loader arm or shaft 31. Shaft rotation with the gear interface illustrated causes sensor shaft 53 to turn. The contacting sensor may be a rotary potentiometer (when using a gear interface) or a linear potentiometer (when using a linkage). The sensor shaft 53 may include a gear to match shaft rotations to the measuring span of the rotary potentiometer. In one alternate embodiment, a 90-degree sensing potentiometer requires reduction gearing to enable 180 degrees of shaft 31 rotation to be monitored by the potentiometer. A similar reduction means is necessary if linkages are used in lieu of gearing to transfer shaft 31 rotation to a rotary potentiometer having an operating range less than the 180 degrees of operating rotation of the shaft.

The control system comprises controller 200 which manages the bale loading process and enables automated loading of a bale. Controller 200 is programmed and configured to receive inputs signals, perform computational operations based on those input signals, and generate output signals for directing movement of actuators in the bale loader 30 and the bale wagon 10. The controller may be a separate unit dedicated to managing operation of the bale loader 30 or its function may be integrated into a controller tasked to manage the entire operation of the bale wagon. Controller 200 receives a bale lifting arm position signal 201 indicating the position of the arm and a grasping position signal 226 indicating the state of the bale grasping arms. An operator-selectable mode input enables the bale loader to be staged for automatic bale pickup operation, a transit mode in which the bale lifting arm is positioned for transit operation of the bale wagon, or a manual mode for manual operation of the bale loader. In the automatic mode, a contact switch in the bumper is activated when the bale wagon operator positions the bale grasping apparatus around a bale. Once initiated, the controller 200 generates a signal grasping control valve 220 to close the grasping arms 62 around the bale and begin the lifting. Grasping arm position may be confirmed by position sensor(s) monitoring grasping arm positon, hydraulic pressure in the grasping actuator (pressure sensors 222), or other known means. With the bale secured, the lifting process is initiated by the controller to move the bale from the ground to the tilting table.

A lifting arm signal 211 is directed toward the hydraulic control valve 210 for actuator 40 to cause desired movement of the bale lifting arm, from the ground positon to a position over the tilting table in this discussion. The grasping arms release the bale on the tilting table and the lifting arm is returned to the ground pickup position. Bale collection and loading efficiency is enhanced by the automated bale loading mode as the bale wagon operator may move the bale wagon to the next bale on the ground while the lifting arm is repositioning the bale in the grasping apparatus without the distraction of manually operating the loader.

The bale loading process may also be manually initiated through an operator input apparatus 250, initiated upon sensing that a bale has been properly grasped in the grasping apparatus by a pressure sensor 222 monitoring grasping actuator 68 pressure and generating grasping input signal 223, or the process may be automatically initiated upon sensing the presence of a bale within the grasping apparatus 60 by using a contact sensor 69 incorporated into the grasping apparatus to initiate the bale grasping operation by contact signal 226 followed by the bale loading operation.

Controller 200 may also include a counting function to monitor the number of bale loading cycles completed. The counter is needed to coordinate operation of the tilting table 22, which requires a full or partial tilting movement with each bale placement on the table 22. With an input for the bale capacity of the bale wagon (dependent upon the desired bale stack configuration), either built into the controller function or selectively input by an operator using the operator input apparatus 250, the controller 200 can determine when the maximum load of the bale wagon has been reached and, using the position function that enables a partial lowering of the bale lifting arm described above, coordinate movement of the bale lifting arm to an intermediate position at which the tilting table 22 can be repositioned for transport and then direct the bale lifting arm 32 to return to the fully raised position for transport. Tilt table position is determined by well known means resulting in a tilt table position signal 241 which is provided to controller 200. Controller 200 the operationally coordinates movement of the tilting table 22 with the bale loader 30 by providing the tilt table position signal 242 which directs movement of the tilt table, generally by directing movement of the tilt table hydraulic actuators similar to the methods discussed above with respect to the bale loading arm actuator control.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A system for managing movement of a bale loading apparatus on an agricultural bale wagon, the bale loading apparatus having a bale lifting arm connected at one end to a rotatable shaft and to a bale grasping mechanism connected at an opposing end, the bale lifting arm rotatable relative to the bale wagon in a generally vertical plane between generally opposing first and second angular positions, an actuator coupled to the bale lifting arm to cause angular movement thereof between the first and second angular positions, the system comprising:

a single sensor affixed to the bale wagon to monitor position of a sensor target and initiate a position signal representative thereof, the position signal varying in relation to the lifting arm position between the first and second angular positions, wherein the sensor target is configured to produce a unique proximity to the sensor for any lifting arm position between the first and second angular positions; and a controller programmed and configured to receive the position signal and generate an actuator output signal causing movement of the lifting arm between the first and second angular positions.

2. The system of claim 1, wherein the first and second angular positions are separated by more than 90 degrees.

3. The system of claim 2, wherein the first and second angular positions are separated by approximately 180 degrees.

4. The system of claim 2, wherein the sensor is a non-contacting sensor monitoring proximity of the sensor target.

5. The system of claim 1, wherein the lifting arm further comprises a rotatable shaft and the sensor target is disposed on the shaft for rotation therewith.

6. The system of claim 5, wherein the sensor target is a single sensor target, the sensor target being a surface extending generally perpendicular to a rotational axis of the shaft or an eccentric surface extending at least 180 degrees around the circumference of the shaft.

7. The system of claim 5, wherein the sensor target produces variations in proximity in an axial direction of the shaft from a fixed point on the shaft.

8. The system of claim 1, wherein the sensor is mechanically coupled to the sensor target.

9. The system of claim 8, wherein the sensor target is one of a gear or linkage, the sensor target including a reduction member to enable the sensor target to monitor approximately 180 degrees of rotation of a shaft.

10. The system of claim 1, wherein the sensor target comprises a rotation transfer linkage operably connected to the sensor, and wherein the sensor is a linear potentiometer.

11. The system of claim 1, wherein the sensor target comprises a gear operably connected to the sensor, and wherein the sensor is a rotary potentiometer.

12. A system for managing movement of a bale loading apparatus on an agricultural bale wagon, the bale loading apparatus having a bale lifting arm connected at one end to a rotatable shaft and to a bale grasping mechanism connected at an opposing end, the grasping mechanism moveable between a grasping position and a release position, the bale lifting arm rotatable relative to the bale wagon in a generally vertical plane between generally opposing first and second angular positions, an actuator coupled to the bale lifting arm to cause angular movement thereof between the first and second angular positions, the system comprising:

a single position sensor affixed to the bale wagon to monitor position of a sensor target and initiate a position signal representative thereof, the position signal varying in relation to the lifting arm position between the first and second angular positions, wherein the sensor target is connected to the lifting arm for movement therewith and configured to produce a unique proximity relative to the position sensor corresponding to a single lifting arm position between the first and second angular positions;

an input device for generating an initiation signal to commence a bale loading cycle by the bale loading apparatus; and a controller programmed and configured to receive the initiation signal and generate an actuator output signal causing the actuator to move the lifting arm, the controller further programmed and configured to receive the position signal and manage the actuator output signal responsive to the position signal to cause movement of the bale lifting arm between the first and second angular positions.

13. The system of claim 12, wherein the first and second angular positions are separated by approximately 180 degrees.

14. The system of claim 12, wherein the input device is a bale sensor disposed on the grasping mechanism configured to detect the presence of a bale positioned for pickup by the grasping mechanism and initiate the initiation signal in response thereto.

15. The system of claim 12, wherein the position sensor is a non-contacting sensor monitoring proximity of the sensor target.

16. The system of claim 12, wherein the lifting arm further comprises a rotatable shaft and the sensor target is disposed on the shaft for rotation therewith.

17. The system of claim 12, wherein the position sensor is mechanically coupled to the sensor target.

18. The system of claim 17, wherein the sensor target comprises a rotation transfer linkage operably connected to the sensor.

19. The system of claim 18, wherein the position sensor is a linear potentiometer.

20. The system of claim 17, wherein the sensor target comprises a gear operably connected to the position sensor and the position sensor is a rotary potentiometer.

* * * * *